United States Patent [19]

Araki et al.

[11] 4,396,840

[45] Aug. 2, 1983

[54] IONIZATION TYPE SMOKE SENSING DEVICE

[75] Inventors: Tsunehiko Araki, Takarazuka; Yoshihiko Okuda, Ikoma; Takeshi Nakano, Daitou, all of Japan

[73] Assignee: Matsushita Electric Works, Ltd., Osaka, Japan

[21] Appl. No.: 192,715

[22] Filed: Oct. 1, 1980

[51] Int. Cl.³ .............................................. G01T 1/18

[52] U.S. Cl. .................................... 250/381; 250/385

[58] Field of Search ............... 250/374, 382, 384, 385; 340/579

[56] References Cited

U.S. PATENT DOCUMENTS

| | | | |
|---|---|---|---|
| 3,500,368 | 3/1970 | Abe | 250/385 |
| 3,767,917 | 10/1973 | Lampart et al. | 250/385 |
| 4,044,262 | 8/1977 | Minowa | 250/385 |

*Primary Examiner*—Alfred E. Smith
*Assistant Examiner*—Janice A. Howell
*Attorney, Agent, or Firm*—Birch, Stewart, Kolasch & Birch

[57] ABSTRACT

An ionization type smoke sensing device includes a printed board. An inner electrode made of heat-resistant metal is attached to the printed board and a radioactive source is fixed to the inner electrode. An outer electrode in the form of a bottomed cylinder made of heat-resistant metal and adapted to cover the inner electrode extends through the printed board and is integrally joined to a protective lid member made of heat-resistant metal at the back of the printed board. Therefore, the outer electrode and the lid member cooperate with each other to define an ionization chamber. The outer electrode is formed with smoke inlet ports for introducing smoke into the ionization chamber. The electric circuit serves to give pulse signals of a relatively high voltage to the outer electrode and to detect the presence of smoke on the basis of the amount of a current flowing through the inner electrode.

22 Claims, 13 Drawing Figures

IONIZATION TYPE SMOKE SENSING DEVICE

BACKGROUND OF THE INVENTION

1. Field of the Invention

The present invention relates to an ionization type smoke sensing device. More particularly, the invention relates to an ionization type smoke sensing device which includes an ionization chamber using a radioactive source and operates to detect smoke flowing into the ionization chamber.

2. Description of the Prior Art

There has been put into practical use an ionization type smoking sensing device including an ionization chamber using a radioactive source and adapted to detect smoke flowing into the ionization chamber on the basis of the amount of an electric current flowing through the ionization chamber. FIG. 1 is a schematic view of an example of a conventional ionization type smoke sensing device. The smoke sensing device shown in FIG. 1 includes an anode electrode 2 and a cathode electrode 4, which define an ionization chamber 7. The anode electrode 2 is in the form of a bottomed cylinder whose peripheral surface is formed with smoke inlet ports 1. The anode electrode 2 and cathode electrode 4 are both made of heat-resistant metal, such as stainless steel. The cathode electrode 4 is dish-shaped, having a radioactive source 3 attached to the inner surface thereof. The cathode electrode 4 is fixed to the anode electrode 2 by screws 6 with an insulating material 5, such as a ceramic material, interposed therebetween. Therefore, the ionization chamber is defined by the anode electrode 2 and cathode electrode 4. Current detecting means (not shown) is provided for detecting an electric current flowing between the anode electrode 2 and cathode 4. If smoke, e.g., from a fire flows into the ionization chamber 7 through the smoke inlet ports 1, the amount of electric current flowing between the anode electrode 2 and cathode electrode 4 changes, whereby the presence of smoke is detected.

Such ionization type smoke sensing device using a radioactive source 3 must be so arranged that even if it is subjected to intense heat from, e.g., a fire, the radioactive source 3 will not be scattered out of the ionization chamber 7 and lost. To this end, as shown in FIG. 1, the conventional ionization type smoke sensing device uses the insulating material 5 through which the anode electrode 2 and cathode electrode 4 are fixed together, and a heat-resistant material, such as a ceramic material, is used as such insulating material. However, ceramic materials are not only expensive but also are hard to process, thus making smoke sensing devices themselves expensive.

SUMMARY OF THE INVENTION

In brief, the present invention is an ionization type smoke sensing device wherein an outer electrode and a lid member are integrally joined together to define an ionization chamber, in which an inner electrode is fixed to the lid member through an insulating member. The outer electrode is formed with smoke inlet ports, but if the shape and size of the smoke inlet ports are suitably selected, the inner electrode and hence a radioactive source fixed to the inner electrode will not come out of the ionization chamber even if the insulating member is burnt down owing, e.g., to a fire. Therefore, even in the event of a fire, the radioactive source is effectively prevented from being scattered out of the ionization chamber and lost. Therefore, it is no longer necessary to use ceramic materials as insulating materials, which are expensive and very hard to process, as in the prior art, and instead it is possible to use synthetic resins to provide a less expensive, ionization type smoke sensing device.

In a preferred embodiment of the invention, a printed board is used as the insulating member. The printed board is positioned to cover the opening in the outer electrode and has electric circuit components attached thereto and a predetermined wiring provided thereon. The inner electrode is fixed to the printed board, and the outer electrode and lid member are integrally joined together projecting through the printed board. This means that the inner electrode is fixed to the lid member within the ionization chamber through the printed board. In this embodiment, there is no need of specially preparing such insulating member, and the printed board necessary for constituting the electric circuit can be utilized as the insulating member, so that an ionization type smoke sensing device which is inexpensive and simple in construction can be obtained.

In another preferred embodiment of the invention, the printed board includes a first conductive foil connected to the inner electrode, and a second conductive foil connected to the outer electrode and hence to the lid member, with a guard electrode (third conductive foil acting, as a ground electrode) formed between said first and second conductive foils. Resistors each having a predetermined resistance are respectively connected between the first and third conductive foils and between the second and third conductive foils. Therefore, according to this preferred embodiment, there is no leakage current flowing between the inner and outer electrodes and hence there is no possibility of malfunction resulting therefrom.

According to yet another preferred embodiment of the invention, the ionization type smoke sensing device includes a housing which receives the integrated combination of outer electrode and lid member and the printed board. The housing includes a first portion on the back side of the printed board and a second portion on the face side of the printed board, said second portion being fitted in said first portion. The first portion has a base and a lateral wall formed on the peripheral edge of said base, while the second portion includes a lateral wall adapted to be fitted in the lateral wall of the first portion and a cover portion extending from one end of the lateral wall. The lateral wall of the first portion is formed with a first engaging portion and the lateral wall of the second portion is formed with a second engaging portion adapted to engage the first engaging portion. At a position associated with these engaging portions, a predetermined clearance is defined between the two lateral walls, and the base is provided with an undercut portion for communication with the clearance. According to this preferred embodiment, the first and second portion can be easily separated from each other by inserting a tool, such as a screwdriver, into the clearance through the undercut portion. Thus, lateral separation required in the prior device is not necessary, so that there is no danger of producing scratches on the housing to detract from its esthetic value.

Accordingly, a general object of the invention is to provide an improved ionization type smoke sensing device.

Another object of the invention is to provide an ionization type smoke sensing device which is inexpensive and in which a radioactive source can be used with safety.

A further object of the invention is to provide an ionization type smoke sensing device which is simple in construction.

Yet another object of the invention is to provide an ionization type smoke sensing device which is free from malfunction.

Still a further object of the invention is to provide an ionization type smoke sensing device having a housing of improved separating construction.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a front view; FIG. 4 is a bottom view of FIG. 3; FIG. 5 is a top view of FIG. 3; and FIG. 6 is a diagrammatic sectional view taken along the line VI—VI of FIG. 5.

DESCRIPTION OF THE PREFERRED EMBODIMENTS

Figure 1:
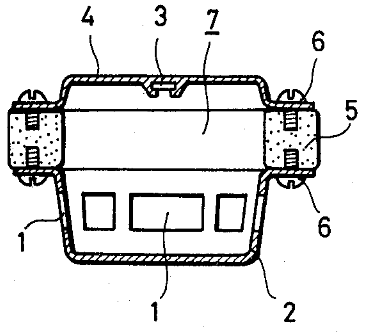
FIG. 1 PRIOR ART
FIG. 1 is a diagrammatic view showing the construction of an example of a conventional ionization type smoke sensing device which forms the background of the invention.
Figure 2:
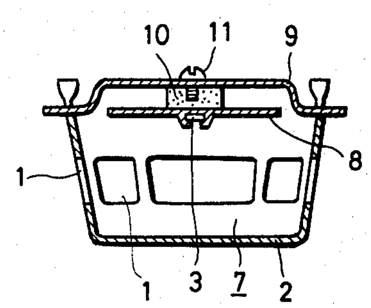
FIG. 2 is a diagrammatic view showing the construction of an embodiment of the present invention.

FIG. 2 is a diagrammatic view of the construction of an embodiment of the invention. At the outset, it is to be pointed out that the cover and other parts have been omitted from illustration in FIG. 2, as in FIG. 1. The ionization type smoke sensing device in this embodiment includes an anode electrode or outer electrode 2 and a cathode electrode or inner electrode 8. The outer electrode 2 is in the form of a bottomed cylinder whose peripheral surface is formed with smoke inlet ports 1. The opening in the outer electrode 2 is closed by a protective lid or second outer electrode 9. That is, the protective lid 9, which is dish-shaped, is fixed to the outer electrode 2, thereby defining an ionization chamber 7. The second outer electrode or protective lid 9 has the inner electrode 8 fixed to the inner surface thereof by a screw 11 with an insulating material 10 interposed therebetween. The inner electrode 8 holds a radioactive source 3. The anode electrode 2, protective lid 9 and cathode electrode 8 are made of heat-resistant metal, such as stainless steel.

In this embodiment, a case in which the insulation material 10 is burnt down by intense heat due to a fire will now be considered. In this case, the radioactive source 3 together with the inner electrode 8 detaches from the protective lid 9. However, since the anode electrode 2 and protective lid 9 are firmly integrally joined together as by crimping, they will not separate from each other even under such intense heat. If, therefore, the shape of the inner electrode 8 is suitably selected, the inner electrode 8 and hence the radioactive source 3 are effectively prevented from being scattered out of the ionization chamber 7. Therefore, according to this embodiment, it is no longer necessary to use heat-resistant ceramic materials as the insulating material 10, as in the past, and it is possible to use synthetic resins which are easy to process and less expensive.

Figure 3:
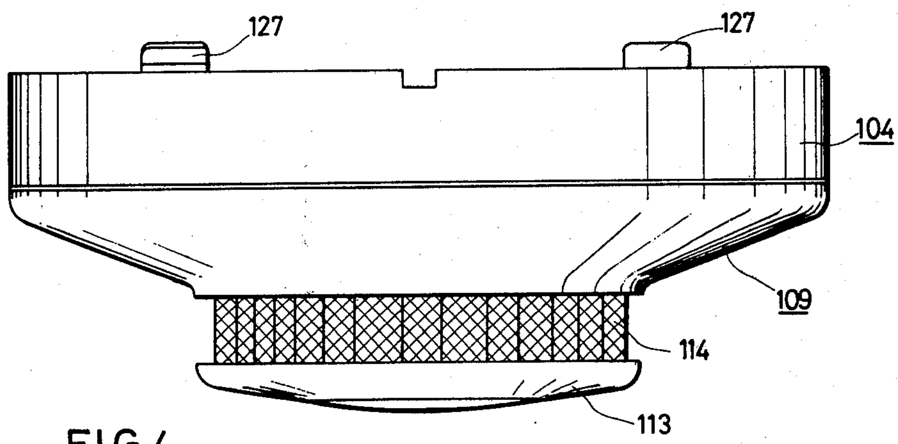
FIGS. 3 through 6 are views showing a preferred embodiment of the invention.
Figure 4:
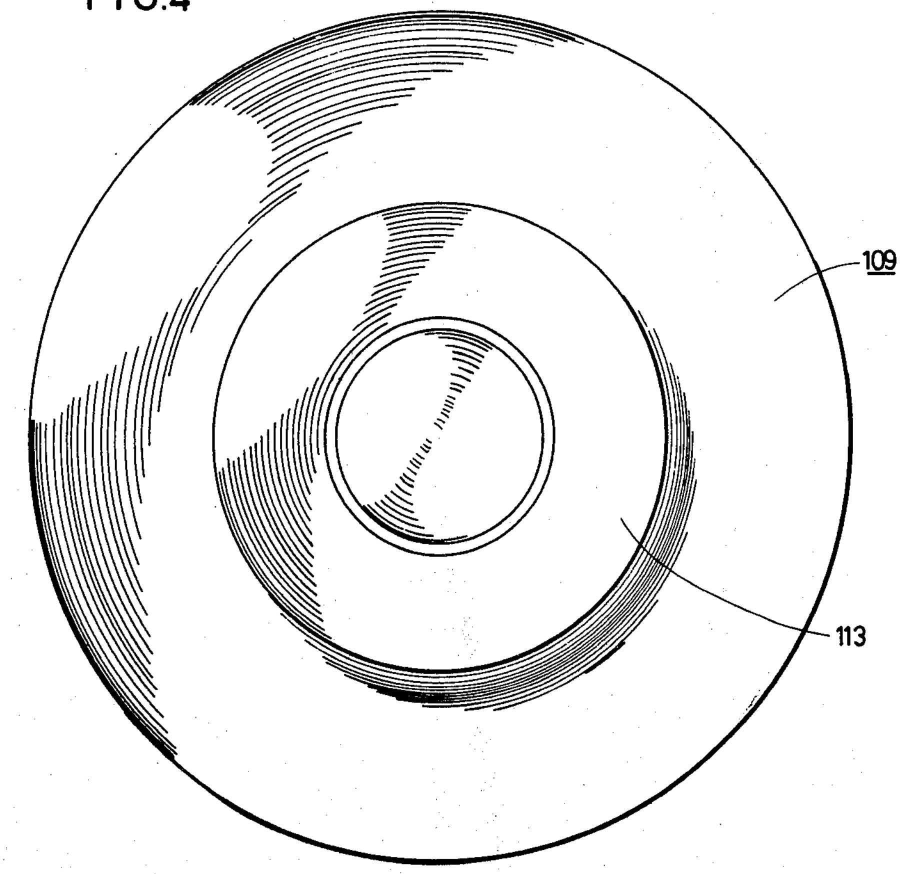
Figure 5:
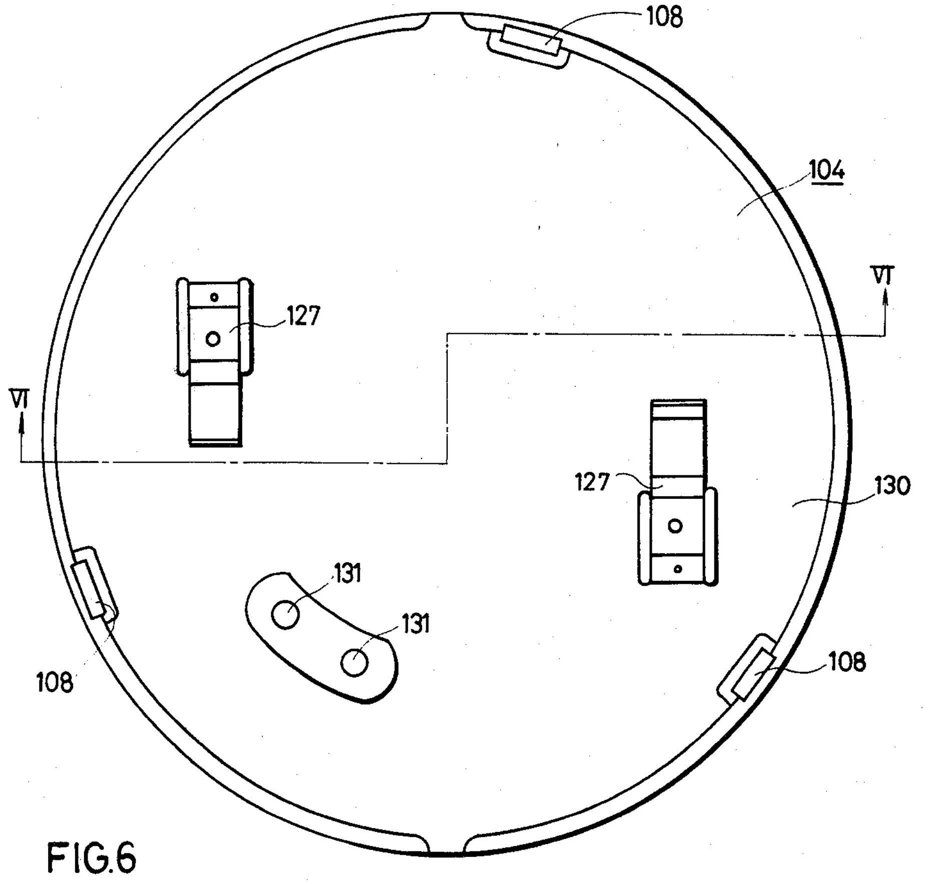
Figure 6:
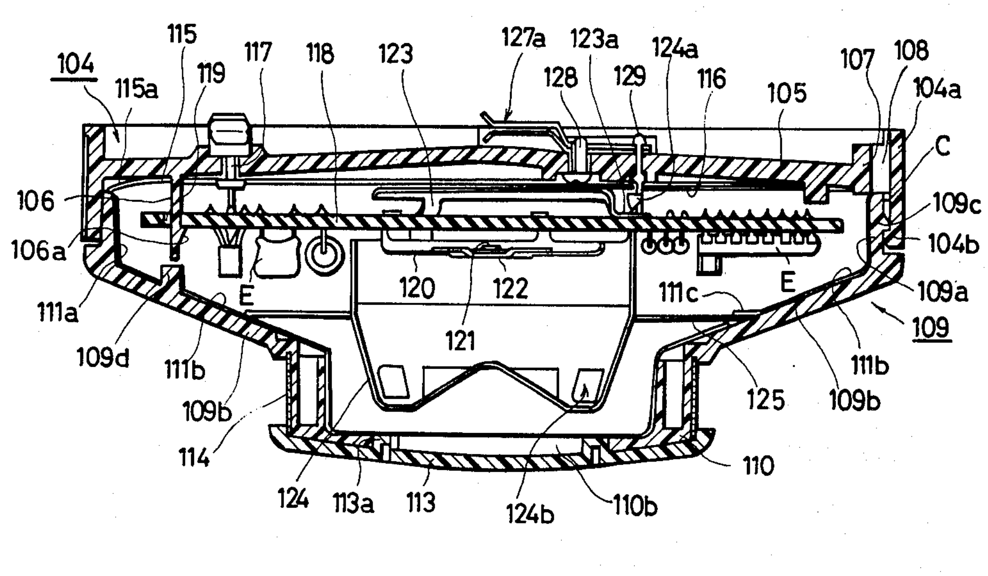
Figure 7:
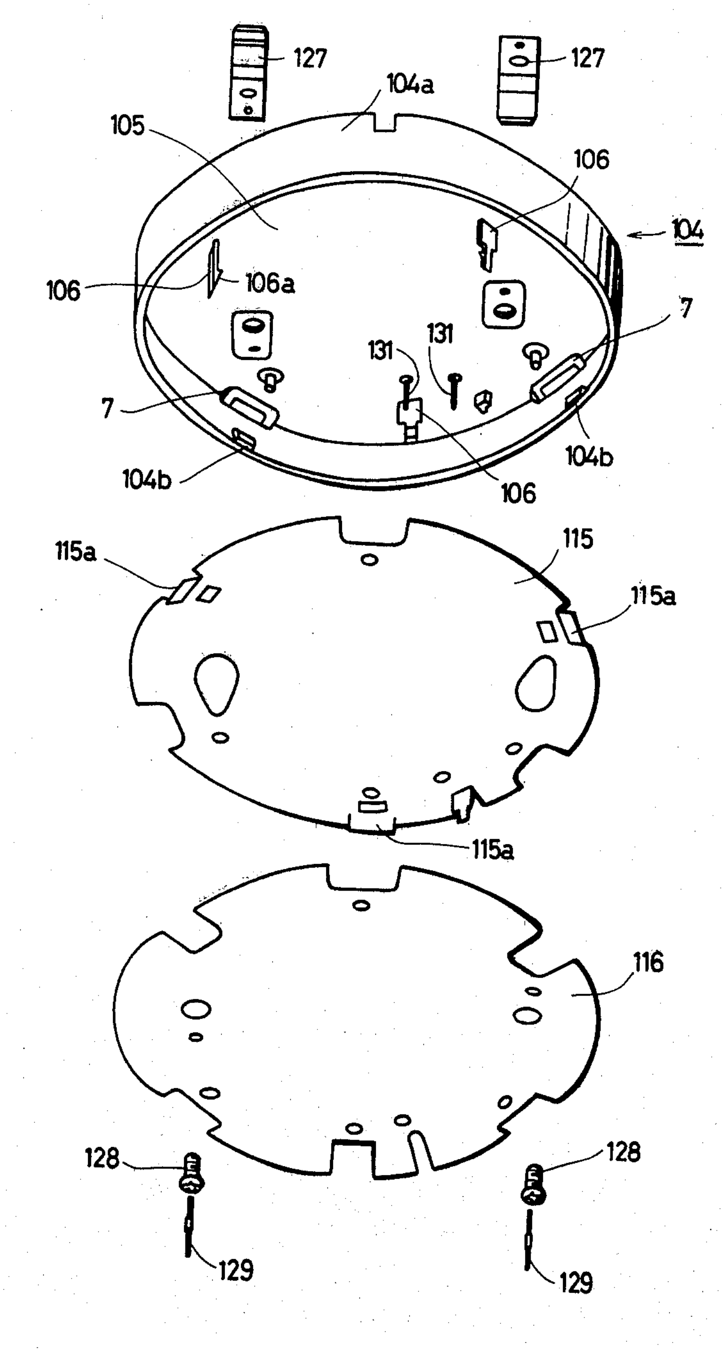
FIG. 7 is an exploded perspective view of a sensor base block assembly.

FIGS. 3 through 6 are views showing a preferred embodiment of the invention. FIG. 3 is a front view; FIG. 4 is a bottom view; FIG. 5 is a front view; and FIG. 6 is a diagrammatic sectional view taken along the line VI—VI of FIG. 5. Further, FIGS. 7, 8, 10 and 11 are exploded perspective view, showing how it is assembled. The construction of this embodiment will first be described with reference to FIGS. 3 through 11, and then the method of assembling the same will be described. This embodiment includes a sensor housing composed of a sensor base block 104 and a sensor cover 109. The sensor base block 104 and sensor cover 109 are molded of synthetic resin and are substantially circular (FIGS. 4 and 5). The sensor base block 104 is formed with a base 105 for defining an inner space. The outer peripheral edge of the base 105 is formed with a lateral wall **104*a* and a plurality of undercut portions 107 (FIGS. 6 and 7). At the positions of the undercut portions, there are provided throughgoing holes 108, which form a feature of the embodiment, as will be later described. Further, the inner surface of the lateral wall 104*a* of the sensor base block 104 is formed with engaging projections 104*b* at positions corresponding to the undercut portions 107, i.e., the throughgoing holes 108 (FIGS. 6 and 7**).

Figure 11:
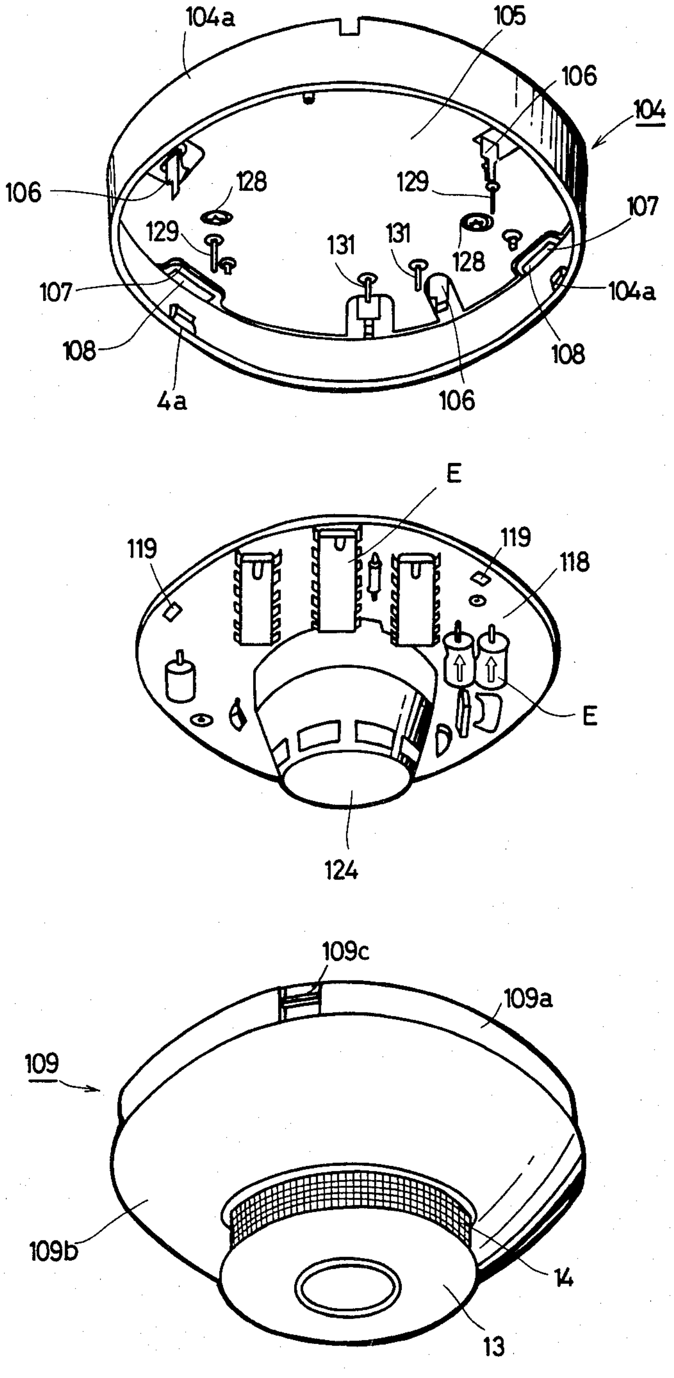
FIG. 11 is an exploded perspective view of the above described assemblies, showing how to assemble them.

On the other hand, the sensor cover 109 includes a lateral wall **109*a* and an inclined surface or a cover portion 109*b* extending from the lower end of the lateral wall 109*a*. The lateral wall 109*a* is fitted in the lateral wall 104*a* of the base block 104. The outer peripheral surface of the lateral wall 109 is formed with second engaging projections 109*c* adapted to engage the engaging projections 104*b* (FIGS. 6 and 11). Therefore, when the lateral wall 109*a* is fitted in the lateral wall 104*a*, the two engaging projections 104*b* and 109*c* engage each other, whereby the sensor base block 104 and the sensor cover 109** are integrally fixed together to form the housing.

A bottomed cylindrical portion 110 extends vertically downward from the inner peripheral edge of the inclined surface **109*b* of the sensor cover 109. The lateral surface of the cylindrical portion 110 is formed with a plurality of throughgoing holes 110*a* which act as smoke inlet holes. The bottom of the cylindrical portion 110 is formed with an engaging hole 110*b*, to which a cap 113 to be later described is attached. The inner surface of the sensor cover 109 is provided with a shield cover 111 (FIG. 10) formed as by press work to have substantially the same shape as the sensor cover 109. The shield cover 111 includes a lateral wall 111*a*** extending along the lateral wall 109*a* of the sensor cover 109, and an inclined surface 111*b* extending from the lower end of the lateral wall 111*a*. The inclined surface 111*b* is formed with a plurality of louvered fins 111*c* (FIG. 10), which serve to install a partition plate 125. Further, an engaging hole 111*d* engages an engaging projection 109*d* on the sensor cover 109, whereby the shield cover 111 and sensor cover 109 are held together. A cylindrical net formed of, e.g., a thin stainless steel sheet processed into mesh form as by etching and is disposed on the cylindrical portion 110 of the sensor cover 109. The net 114 is provided for preventing small insects from entering the device through the throughgoing holes 110*a*. The net 114 is held between the cap 113 (FIG. 10) and the cylindrical portion 110 by fitting the cap 113 in the hole 110*b* of the cylindrical portion 110 and is fixed to the sensor cover 109 as by ultrasonic welding.

The base 105 is formed with fixing ribs 106 (FIG. 7) for fixing a printed board 118 in position. The printed board 118 is formed with throughgoing holes 119 (FIGS. 9 and 11) associated with said ribs 106. Therefore, engaging portions at the front end of the fixing ribs 106 extend through the througoing holes 119 to engage the printed board 118, whereby the latter is fixed to the base 105. Disposed between the printed board 118 and the base 105 are a shield plate 115 and an insulating sheet 116 (FIGS. 6 and 7). The shield plate 115 is formed on the peripheral edge thereof with louvered fins 115*a*, which will abut against the upper end of the lateral wall of the sensor cover 109 when the sensor cover 109 is fitted in the sensor base block 104. Therefore, these louvered fins 115*a* are resiliently held between the base 105 and the sensor cover 109. On the other hand, the insulating sheet 116 is made of an insulating material, such as polyester film, and effectively prevents the shield plate 115 and the exposed portion of the printed board 118 from electrically contacting each other. The shield plate 115 and the insulating sheet 116 are attached to the base 105 by a screw 117 (FIG. 6).

Figure 9:
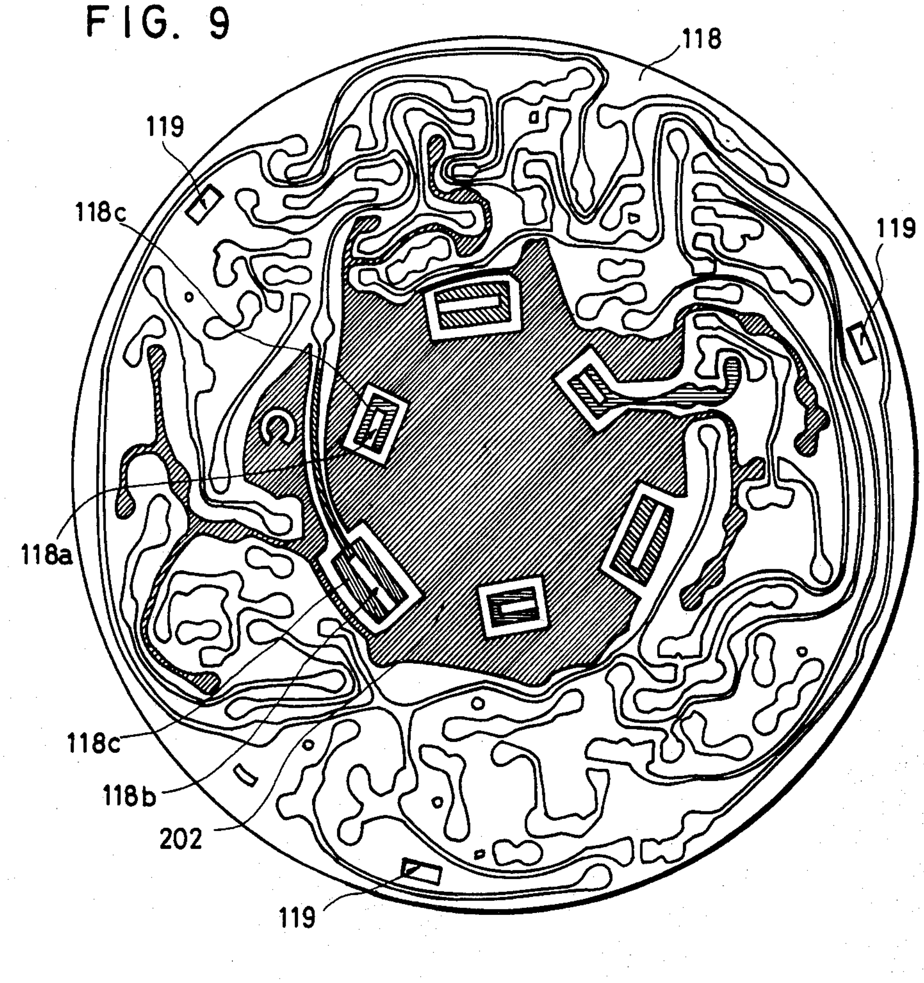
FIG. 9 is a view showing an example of the printed board.
Figure 8:
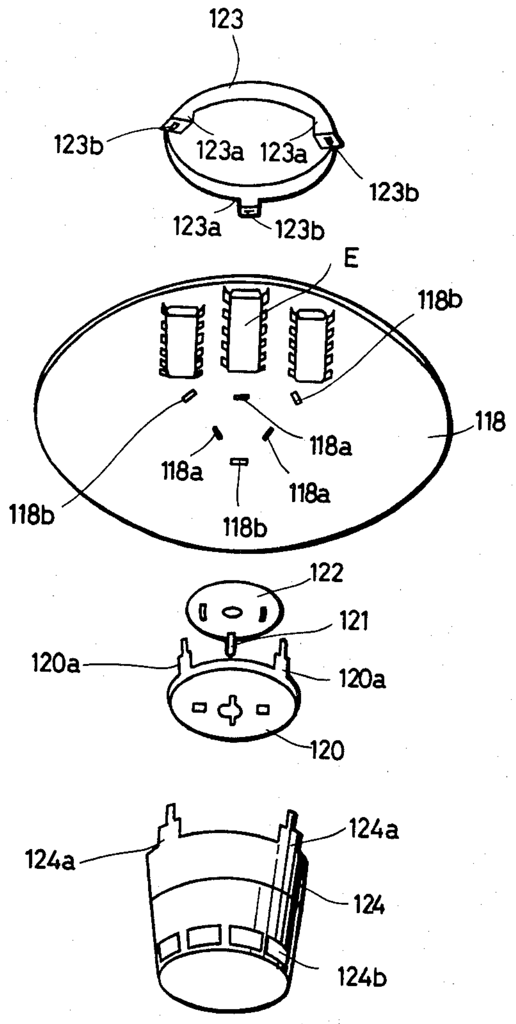
FIG. 8 is an exploded perspective view of a printed board assembly.

The printed board 118 has a conductive pattern, such as one shown in FIG. 9, and has attached thereto electric components E, such as integrated circuits, shown in FIG. 8. The printed board 118 is formed with two sets of triangular throughgoing holes 118*a* and 118*b* (FIGS. 8 and 9). The throughgoing holes 118*a* serve to attach an inner electrode or cathode electrode 120, to be later described, thereto while the throughgoing holes 118*b* serve to attach an outer electrode or anode electrode 124, to be later described, thereto. The cathode electrode, namely, the inner electrode 120 is substantially in the form of a disk made of heat-resistant metal, e.g., stainless steel and is formed on the peripheral edge thereof with three substantially vertically extending attaching legs 120*a*. The attaching legs 120*a* are inserted in the associated holes 118*a* and soldered to the conductive patterns 118*c* formed around the holes 118*a*, whereby the cathode electrode 120 is mechanically fixed to the printed board 118 and electrically connected thereto.

A radioactive source 121 is provided between the inner electrode, namely, the cathode electrode 120 and the printed board 118. The radioactive source 121 is held between a radioactive source fixing plate 122 in the form of a disk made of, e.g., stainless steel, and the cathode electrode 120 and is held integrally with the latter by fixing the fixing plate 122 to the cathode electrode 120. The fixing plate 122 can be fixed to the cathode electrode 120 as by crimping. The outer electrode, namely, the anode electrode 124 is in the form of a bottomed cylinder made of a heat-resistant metal, e.g., stainless steel. Therefore, the anode electrode 124 has an opening whose edge is integrally formed with attaching legs 124*a*. On the other hand, the back side of the printed board 118 is formed with a second anode electrode 123 which serves as a protective lid (lid member). The second anode electrode 123 is substantially in the form of a disk made of heat-resistant metal, e.g., stainless steel. Attaching legs 123*a* extend from the peripheral edge of the second anode electrode 123 and are bent parallel with the printed board 118, with a slit 123*b* formed in each bend. The attaching legs 124*a* of the outer electrode, namely, anode electrode 124 extend through the associated throughgoing holes 118*b* and then through the associated slits 123*b*. The upper ends of the attaching legs 124*a* are then twisted and soldered, whereby the anode electrode 124 and the second anode electrode 123 are firmly joined together. These anode electrodes 124 and 123 define the ionization chamber described previously. The anode electrode 124 is formed with smoke inlet holes 124*b*. By suitably selecting the shape and size of the smoke inlet holes 124*b*, the possibility of the radioactive source 21 being scattered out of the ionization chamber and lost is avoided. More particularly, even if the smoke sensing device is burnt down by, e.g., a fire, the radioactive source 121 can be recovered without fail if only the integral combination of the anode electrode 124 and second anode electrode 123 is recovered. Such recovery can be effected very easily. In addition, the electrodes 120, 123 and 124 may be formed to a predetermined shape as by press work.

The partition plate 125 is held by the louvered fins 111*c* of the shield plate 111, as described above. The partition plate 125 is composed of an insulating material, such as polyester films, and has a hole 126 for receiving the anode electrode 124. The anode electrode 124 is fitted in the hole 126, whereby smoke which has flowed into the housing is prevented from flowing out.

The sensor base block 104 has hangers 127 fixed to the base 105 thereof by screws 128. The hangers 127 serve to connect the electric circuit formed on the printed board to an external power source (not shown). Therefore, connecting terminals 129 are connected between the hangers 127 and the printed board 118, whereby a predetermined source voltage is applied to the electric circuit through the hangers 127. Further, the outer surface of the base is provided with an insulating cover 130 which is substantially in the form of a disk (FIG. 5). The base 105 is also provided with terminals 131 for deriving the detected output. The way this embodiment including the components described above is assembled will now be described in detail with reference to FIGS. 7, 8, 10 and 11. First, the way the respective assemblies are assembled will be individually described, and then the manner of general assembly will be described with reference to FIG. 11.

Referring to FIG. 7, the manner of assembling the sensor base block assembly is illustrated. This sensor base block assembly basically includes the shield plate 115 and the insulating sheet 116. First, the hangers 127 are placed on the back side of the base 105 and the screws are driven in from the opposite side so as to fix the hangers 127 to the back side of the base 105. Subsequently, the connecting terminals 129 are inserted to extend through the base 105 and are soldered to the hangers 127. The output terminals 131 are also fixed to the base 105. The shield plate 115 and the insulating sheet 116 are placed in this order on the opposite side of the base 105 and are fixed to the latter by the screws 117. In this manner, the sensor base block assembly is assembled.

Referring to FIG. 8, the manner of assembling the printed board is shown. The printed board assembly basically includes the printed board 118 on which the electric components E are fixed and electrically connected, the inner electrode 120 with the radioactive source 121 fixed thereto, the outer electrode 124, and the lid member (second anode electrode) 123. First, the predetermined electric components E are attached to the printed board 118 and wiring is made as by soldering. The radioactive source 121 is then held between the fixing plate 122 and the cathode electrode 120 and is fixed to the cathode electrode 120. Subsequently, the attaching legs 120*a* of the cathode electrode 120 are inserted in the associated holes 118*a* in the printed board 118 and fixed in position as by crimping and the attaching legs 120*a* are further fixed to the printed board 118 as by soldering. Subsequently, the outer electrode, namely, the anode electrode 124 is installed by inserting its attaching legs 124*a* in the associated holes 118*b* in the printed board 118 until they project beyond the back side of the printed board 118. The second anode electrode 123 is applied to the back side of the printed board 118 in such a manner that the projecting attaching legs 124*a* are inserted in the slits 123*b* in the lid member, namely, second anode electrode 123. Subsequently, the ends of the attaching legs 124*a* are twisted and then soldered for firm fixation. In this manner, the printed board assembly is assembled.

Figure 10:
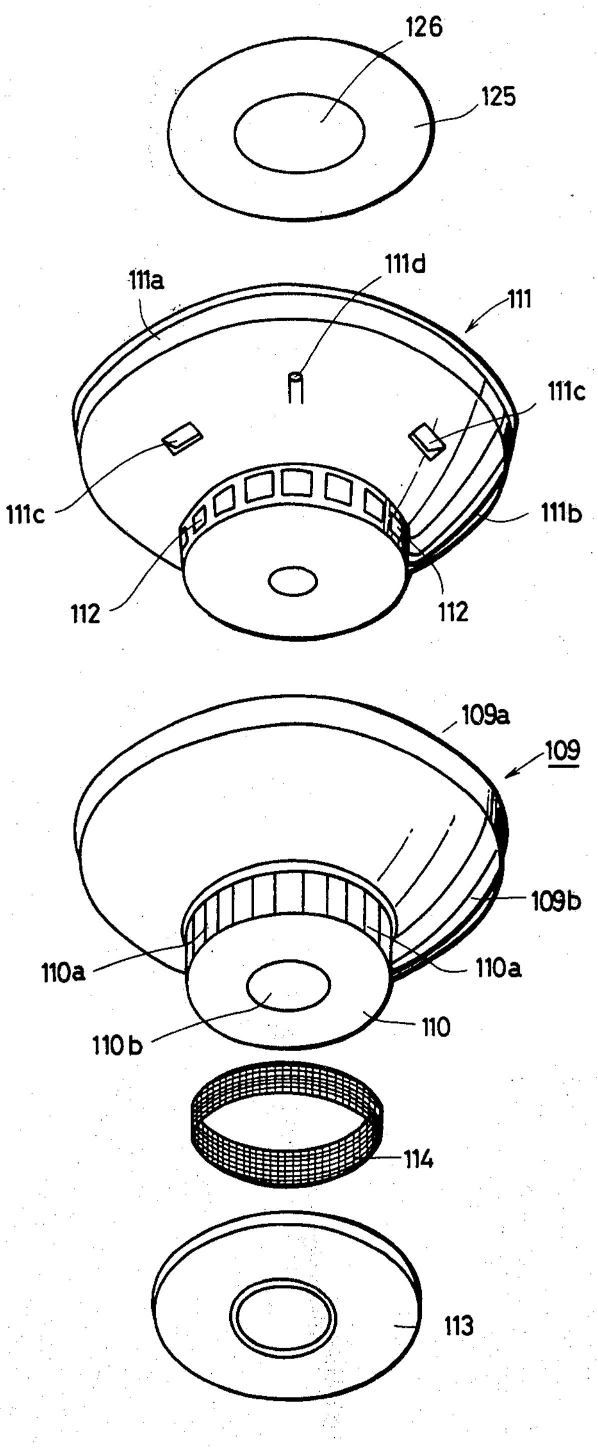
FIG. 10 is an exploded perspective view of a cover assembly.

Referring to FIG. 10, the way of assembling the sensor cover assembly including the shield cover is shown. The partition plate 125 is positioned with its outer periphery engaging the louvered fins 111*c* on the inclined surface 111*b* of the shield cover 111, whereby the partition plate 125 is held by the shield cover 111. Subsequently, the engaging projections 109*c* (FIG. 6) formed on the sensor cover 109 are inserted in the engaging holes 111*d* in the shield cover 111 to hold the shield cover 111 along the inner surface of the sensor cover 109. As for the sensor cover 109, the net 114 preformed in annular shape is held between the cap 113 and the sensor cover 109 by inserting the cap 113 in the hole 110*b*. This is followed by ultrasonic welding or the like. In this way, the sensor cover assembly is assembled.

Referring to FIG. 11, the assembly thus completed is shown. The printed board assembly is attached to the sensor base block assembly. That is, the fixing ribs 106 are inserted in the associated throughgoing holes 119 to lock the printed board 118 by the engaging portions 106*a*. In addition, at this time, the power source connecting terminals 129 are inserted in the associated holes in the printed board 118 and fixed in position as by soldering. Further, the terminals for deriving the detected output from the electric circuit including the printed board 118 are fixed on the printed board at predetermined positions as by soldering, as in the connecting terminals 129. Thereafter, the anode electrode 124 is inserted in the hole 126 in the partition plate 125 included in the shield cover assembly and the engaging projections 109*b* on the sensor cover 109 and the engaging projections 104*b* on the sensor base clock 104 are brought into engagement with each other. In this way, the ionization type smoke sensing device shown in FIGS. 3 through 6 is assembled.

Figure 12:
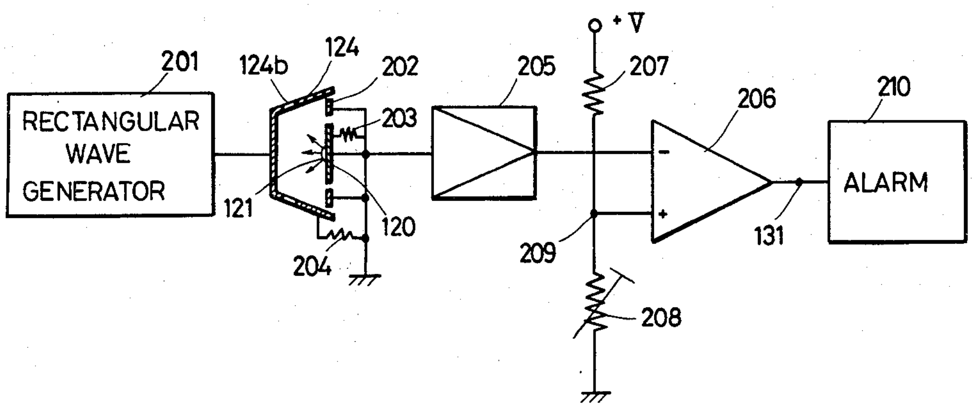
FIG. 12 is a block diagram showing the electric circuit of the ionization type smoke sensing device.
Figure 13:
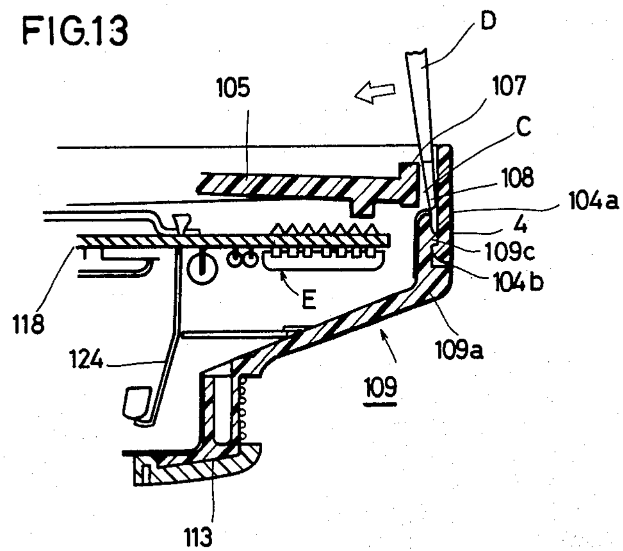
FIG. 13 is a fragmentary sectional view, showing the method of separation of a sensor cover used in this embodiment.

Referring to FIG. 12, the electric circuit of such ionization type smoke sensing device will now be described. Such electric circuit is mainly arranged on the printed board 118. A rectangular wave signal from a rectangular wave generator 201 is applied to the outer electrode, namely, anode electrode 124. The inner electrode, namely, cathode electrode 120 is connected to an amplifier 205, whose output is connected to one input terminal (−) of a comparator 206. The other input terminal (+) of the comparator 206 is connected to a point 209 of series connection between a resistor 207 and a variable resistor or semi-fixed resistor 208. Therefore, a voltage (+V) is divided by the series combination of resistor 207 and variable resisor 208 and a fraction thereof appears at the point of connection 209 as a reference voltage. At the comparator 206, an output is derived when the output from the amplifier 205 reaches the reference voltage. This detected signal from the comparator 206 is derived from the output terminals 131 (FIGS. 5 and 11) and provided to a control circuit 210. In response to the detected signal from the comparator 206, the control circuit 210 drives alarm means (not shown) or controls a sprinkler (not shown).

In operation, a relatively high rectangular wave voltage is applied to the outer electrode, namely, anode electrode 124. As a result, the radioactive source 121 fixed to the inner electrode, namely, cathode electrode 120 is ionized to fill the ionization chamber with ions. In the steady state, the cathode electrode 120 produces a constant output current and hence the amplifier 205 also produces a constant output voltage. However, such output voltage in the steady state is sufficiently lower than the reference voltage set by the variable resistor 208. If smoke, e.g., from a fire flows into the ionization chamber through the smoke inlet ports 124*b*, the state of the electric current in said chamber changes, providing an increased output current from the cathode electrode 120. Therefore, the amplifier 205 also provides an increased output voltage, which is higher than the reference voltage from the point of connection 209. An output is derived from the comparator 206, so that the presence of smoke is detected by the smoke sensing device.

In FIG. 12, a guard electrode 202 is provided between the outer electrode 124 and the inner electrode 120. The guard electrode 202 is grounded. Such guard electrode is formed on the printed board, as shown in FIG. 9. More particularly, on the printed board 118, the guard electrode 202 is disposed between an electrode 118*c* for attachment of the outer electrode 124 and an electrode 118*d* for attachment of the inner electrode 120. Such guard electrode 202 serves to effectively prevent leakage current from flowing between the two electrodes 120 and 124. A resistor 203 is connected between the cathode electrode 120 and the guard electrode 202, namely, the ground, while a resistor 204 is connected between the anode electrode 124 and the ground, namely, guard electrode 209. These resistors 203 and 204 allow the leakage current produced between the anode electrode 124 and cathode electrode 120 to flow to the ground, protecting the ion current in the ionization chamber against adverse effects. Further, the leakage current due to the resistor 204 is caused to flow in a direction which reduces the ion current in the ionization chamber, thereby eliminating malfunction due to leakage current resulting from moisture and dust between the anode electrode 124 and the cathode electrode 120. In this way, if the guard electrode is formed on the printed board 118, it can be formed simultaneously with the formation of other parts on the printed board constituting the electric circuit, without requiring the special step of separately forming the guard electrode. Therefore, a stabilized device which will not malfunction owing to leakage current can be produced less expensively by using a simpler arrangement.

Another feature of the embodiment described above lies in the assembling and separating construction for the sensor base block 104 and sensor cover 109. More particularly, in the sensor base block 104 and sensor cover 109 assembled in the manner shown in FIG. 11, a clearance C is formed between the lateral wall 109*a* of the sensor cover 109 and the lateral wall 104*a* of the sensor base block 104, as shown in FIG. 6. This clearance C communicates with the throughgoing hole 108 in the undercut portion 107. Therefore, when the sensor base block 104 and the sensor cover 109 are separated from each other, there is no possibility of scratches being produced on the lateral surfaces of the lateral walls 104*a* and 109*a*. That is, when it is desired to separate the sensor base block 104 and the sensor cover 109 from each other, this can be done by inserting, e.g., the front end of a screwdriver D into the clearance C through the throughgoing hole 108 in the undercut portion 107 and then tilting the screwdriver D in the direction of arrow. In so doing, the engagement between the engaging projections 104*b* and the engaging projections 109*b* on the sensor cover 109 is canceled. The region into which the screwdriver D is inserted is substantially the interior of the housing. Therefore, even if scratches should be produced by the front end of such screwdriver D, such scratches could not be seen from outside. Therefore, there is no possibility that scratches which can be seen from outside are produced owing to separation of the housing. Thus, the initial condition can be maintained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ionization type smoke sensing device comprising:
- an outer electrode in the form of a bottom cylinder made of heat-resistant metal and having an opening,
- a lid member made of heat-resistant metal, integrally joined to said outer electrode to close said opening in said outer electrode and cooperating with said outer electrode to define an ionization chamber,
- an insulating member comprising a printed circuit board containing electrical elements for forming an electrical circuit,
- an inner electrode fixed to said lid member through said insulating member and disposed in said ionization chamber,
- a radioactive source fixed to said inner electrode so as to be faced toward the bottom of said outer electrode, and
- smoke inlet ports formed in said outer electrode and sized such that they are sufficiently large to introduce smoke into said ionization chamber but sufficiently small to prevent the radioactive source fixed to said inner electrode from escaping therethrough,
- said electrical circuit means applying a voltage for ionization of said radioactive source to said outer electrode and detecting entry of smoke into said ionization chamber through said smoke inlet ports based on the amount of electrical current flowing into said outer electrode, and
- said lid member being fixed to the outer electrode by the extension of the outer electrode through the printed circuit board to the rear side thereof whereby the lid member serves as a fixture for fixing the outer electrode to the printed circuit board.

2. An ionization type smoke sensing device as set forth in claim 1, wherein
- said insulating material includes synthetic resins.

3. An ionization type smoke sensing device as set forth in claim 2, wherein
- said printed board has a sufficiently larger area than the area of said opening in said outer electrode and is disposed to cover said opening, and
- said outer electrode and said lid member are integrally joined together while extending through said printed board.

4. An ionization type smoke sensing device as set forth in claim 3, wherein
- said inner electrode is fixed to said printed board, whereby said inner electrode is fixed to said lid member through said printed board.

5. An ionization type smoke sensing device as set forth in claim 4, wherein
- said printed board includes
  - a first conductive foil constituting said electric circuit means and electrically connected to said inner electrode through which said first conductive foil extends, and
  - a second conductive foil constituting said electric circuit means and electrically connected to said outer electrode.

6. An ionization type smoke sensing device as set forth in claim 5, wherein
- said printed board further includes a third conductive electrode disposed between said first and second conductive foils and serving to prevent leakage current from flowing between said first and second conductive foils.

7. An ionization type smoke sensing device as set forth in claim 6, wherein
- said third conductive foil acts as a grounding electrode.

8. An ionization type smoke sensing device as set forth in claim 7, wherein
- said electric circuit means includes
  - a first resistor attached to said printed board and electrically connected between said first and third conductive foils, and
  - a second resistor attached to said printed board and electrically connected between said second and third conductive foils.

9. An ionization type smoke sensing device as set forth in claim 1, which further comprises
- a housing,
- said housing being adapted to accommodate the integral combination of said outer electrode and lid member, and at least some of the circuit parts constituting said electric circuit means.

10. An ionization type smoke sensing device as set forth in claim 9, wherein
- said housing includes a first portion acting as a base, and
a second portion cooperating with said first portion to constitute said housing.

11. An ionization type smoke sensing device as set forth in claim 10, which further comprises
a second smoke inlet port formed in said second portion.

12. An ionization type smoke sensing device as set forth in claim 11, wherein
said first portion includes
a base,
a lateral wall formed on the peripheral edge of said base, and
a first engaging portion formed on the inner surface of said lateral wall, and wherein
said second portion includes
a lateral wall adapted to be fitted in the lateral wall of said first portion,
a cover portion extending from said lateral wall, and
a second engaging portion on said lateral wall for engaging said first engaging portion.

13. An ionization type smoke sensing device as set forth in claim 12, which further comprises
a clearance formed between said two lateral walls at a position associated with said engaging portions, and
an undercut portion formed in said base to communicate with said clearance.

14. An ionization type smoke sensing device as set forth in claim 13, wherein said first and second members are made of synthetic resin.

15. An ionization type smoke sensing device as set forth in claim 14, wherein said insulating member includes synthetic resin.

16. An ionization type smoke sensing device as set forth in claim 15, wherein
said insulating member is constructed as the printed board for attaching thereto electric parts constituting said electric circuit means,
said housing receives said printed board,
said first portion is disposed on the back side of said printed board, and
said second portion is disposed on the face side of said printed portion.

17. An ionization type smoke sensing device as set forth in claim 16, which further comprises
two power source connecting portions provided on said base, and
connecting leads respectively extending from said two power source connecting portions through said base and connected to the power source circuit means for the electric circuit formed on said printed board.

18. An ionization type smoke sensing device as set forth in claim 17, wherein
said printed board is disposed to cover the opening in said outer electrode,
said outer electrode and said lid member extends through said printed board and being integrally joined together, and
said inner electrode is fixed to said printed board.

19. An ionization type smoke sensing device as set forth in claim 18, which further comprises
a first shield member interposed between said printed board and said base,
a second shield member extending along the inner surface of said second portion, and
a third smoke inlet port formed in said second shield member and communicating with said smoke inlet ports.

20. An ionization type smoke sensing device as set forth in claim 19, which further comprises
a partition plate attached to said first shield member and preventing flowing-out of smoke which has entered said shield member.

21. An ionization type smoke sensing device as set forth in claim 20, which further comprises
a second insulating sheet for prevention of electrical contact between said outer electrode and said second shield member.

22. An ionization type smoke sensing device as set forth in claim 13, wherein said base is formed with a throughgoing hole in connection with said undercut portion.

* * * * *